(12) United States Patent
Mckinty et al.

(10) Patent No.: US 7,412,500 B2
(45) Date of Patent: *Aug. 12, 2008

(54) METHOD AND APPARATUS FOR USING A SERIAL CABLE AS A CLUSTER QUORUM DEVICE

(75) Inventors: Stephen J. Mckinty, Theys (FR); Jean-Pascal Mazzilli, Eybens (FR)

(73) Assignee: Sun Microsystems, Inc., Santa Clara, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/034,694

(22) Filed: Jan. 13, 2005

(65) Prior Publication Data

US 2006/0041779 A1 Feb. 23, 2006

(30) Foreign Application Priority Data

Aug. 23, 2004 (EP) .................................. 04292073

(51) Int. Cl.
*G06F 15/177* (2006.01)
(52) U.S. Cl. ...................................... 709/221; 710/110
(58) Field of Classification Search ................. 710/105, 710/107, 108, 240, 110; 709/221
See application file for complete search history.

(56) References Cited

U.S. PATENT DOCUMENTS

| | | | |
|---|---|---|---|
| 4,380,798 A | | 4/1983 | Shannon et al. |
| 4,470,112 A | * | 9/1984 | Dimmick .................... 710/116 |
| 4,644,496 A | | 2/1987 | Andrews |
| 4,754,398 A | | 6/1988 | Pribnow |
| 4,785,394 A | * | 11/1988 | Fischer ........................ 710/114 |
| 4,818,985 A | * | 4/1989 | Ikeda .......................... 710/107 |
| 5,381,415 A | * | 1/1995 | Mizutani .................... 370/447 |
| 5,596,754 A | * | 1/1997 | Lomet ........................ 710/200 |

(Continued)

FOREIGN PATENT DOCUMENTS

EP 712076 A2 5/1996

(Continued)

OTHER PUBLICATIONS

Cheung et al. Optimizing Vote and Quorum Assignments for Reading and Writing Replicated Data. IEEE Transactions On Knowledge and Data Engineering. vol. 1, No. 3. Sep. 1989.*

(Continued)

*Primary Examiner*—Paul R. Myers
*Assistant Examiner*—Matthew D Spittle
(74) *Attorney, Agent, or Firm*—Osha Liang LLP

(57) ABSTRACT

A method for obtaining a quorum vote by a first node using a quorum cable, wherein the quorum cable comprises a first end connected to the first node and a second end connected to a second node, including determining whether the quorum cable is reserved by the second node using a remote reservation input (RRI) on the first end, if the quorum cable is not reserved by the second node asserting a local reservation input (LRI) on the first end by the first node, monitoring a local reservation output (LRO) on the first end by the first node to determine whether the LRO on the first end is asserted in response to asserting the LRI on the first end, and obtaining the quorum vote by the first node, if the LRO on the first end is asserted.

12 Claims, 4 Drawing Sheets

U.S. PATENT DOCUMENTS

| | | | |
|---|---|---|---|
| 5,664,092 A | 9/1997 | Waites | |
| 5,671,407 A * | 9/1997 | Demers et al. | 707/8 |
| 5,673,384 A * | 9/1997 | Hepner et al. | 714/6 |
| 5,828,876 A * | 10/1998 | Fish et al. | 707/1 |
| 5,828,889 A * | 10/1998 | Moiin et al. | 710/240 |
| 5,918,244 A * | 6/1999 | Percival | 711/119 |
| 5,948,109 A * | 9/1999 | Moiin et al. | 714/4 |
| 6,032,216 A * | 2/2000 | Schmuck et al. | 710/200 |
| 6,098,120 A | 8/2000 | Yaotani | |
| 6,105,099 A * | 8/2000 | Freitas et al. | 710/200 |
| 6,108,699 A * | 8/2000 | Moiin | 709/221 |
| 6,243,744 B1 * | 6/2001 | Snaman et al. | 709/220 |
| 6,279,032 B1 | 8/2001 | Short et al. | |
| 6,308,215 B1 | 10/2001 | Kolbet et al. | |
| 6,330,656 B1 * | 12/2001 | Bealkowski et al. | 712/13 |
| 6,363,449 B1 * | 3/2002 | Sides et al. | 710/100 |
| 6,487,622 B1 * | 11/2002 | Coskrey et al. | 710/241 |
| 6,496,914 B1 * | 12/2002 | Vook et al. | 711/170 |
| 6,523,078 B1 * | 2/2003 | Desai | 710/200 |
| 6,615,256 B1 | 9/2003 | van Ingen et al. | |
| 6,622,195 B2 | 9/2003 | Osakada et al. | |
| 6,651,136 B2 * | 11/2003 | Percival | 711/113 |
| 6,774,604 B2 * | 8/2004 | Matsuda et al. | 320/110 |
| 6,823,356 B1 * | 11/2004 | Novaes et al. | 709/201 |
| 6,965,957 B1 * | 11/2005 | Nguyen | 710/100 |
| 6,985,956 B2 * | 1/2006 | Luke et al. | 709/229 |
| 6,986,015 B2 * | 1/2006 | Testardi | 711/202 |
| 7,016,946 B2 | 3/2006 | Shirniff | |
| 7,089,293 B2 * | 8/2006 | Grosner et al. | 709/217 |
| 7,155,524 B1 * | 12/2006 | Reiter et al. | 709/229 |
| 2004/0123053 A1 * | 6/2004 | Karr et al. | 711/152 |
| 2005/0172073 A1 * | 8/2005 | Voigt et al. | 711/114 |
| 2006/0129556 A1 * | 6/2006 | Reuter | 707/8 |

FOREIGN PATENT DOCUMENTS

| | | |
|---|---|---|
| EP | 953903 A2 | 11/1999 |
| EP | 1 117 042 A2 | 7/2001 |
| EP | 1 274 012 A2 | 1/2003 |
| WO | WO2004068650 A1 | 8/2004 |

OTHER PUBLICATIONS

Bingham et al. Reservation-Based Contention Resolution Mechanism For Batcher-Banyan Packet Switches. Electronics Letters. vol. 24, No. 13. Jun. 23, 1988.*

Wool, Avishai. Quorum Systems in Replicated Databases: Science or Fiction? IEEE Bulletin of the Technical Committee on Data Engineering. vol. 21, No. 4. Dec. 1998.*

European Search Report dated Feb. 3, 2005 (6 pages).

IEEE 100 The Authoritative Dictionary of IEEE Standards Terms, seventh edition, Dec. 2000, Definition of Cable.

Dictionary of Computers, Information Processing & Telecommunications, Second edition, 1987, Defintion of Cable.

European Search Report dated Feb. 4, 2005, (2 pages).

* cited by examiner

US 7,412,500 B2

METHOD AND APPARATUS FOR USING A SERIAL CABLE AS A CLUSTER QUORUM DEVICE

CROSS-REFERENCE TO RELATED APPLICATIONS

This application claims priority, under 35 U.S.C. §119, to European Patent Application No. 04292073.6 filed Aug. 23, 2004, entitled "METHOD AND APPARATUS FOR USING A SERIAL CABLE AS A CLUSTER QUORUM DEVICE"

BACKGROUND

A cluster typically refers to a service delivery platform that includes a tightly coupled group of servers (i.e., nodes), storage devices, and software. Each node in the cluster is interconnected to at least one other node in the cluster. The nodes in the cluster are configured such that the cluster as a whole provides the ability to run failover, parallel, and/or scalable resources. Thus, clusters are useful for industries that require high availability of applications and services (e.g., telecommunications industry).

Further, each node is associated with a cluster and is configured to join the cluster it is associated with when the node is booted. However, if the cluster to which the node is configured to join is not present when the node is booted, then the node may attempt to create the specific cluster to which it is configured to join. In some situations, the cluster to which the node is to join is present but due to a communications failure between the node and the cluster, the node is not able to join the cluster and, thus, attempts to create the cluster. In this situation, the cluster may become partitioned resulting in multiple instances of the same cluster being created and executed. The operation of two instances of cluster is commonly referred to as "split-brain" and may result in data corruption, etc.

To solve the aforementioned problem, a node may only create a cluster if the node obtains a sufficient number of quorum votes to obtain a quorum. The quorum refers to the minimum number of quorum votes required to create a cluster, which is typically half the number of nodes in the cluster plus one. Further, each node in the cluster typically has one quorum vote. Thus, if a node attempting to form the cluster is connected to at least half of the other nodes in the cluster, then a quorum is reached and the cluster created.

While the aforementioned scheme is adequate for clusters containing a relatively large number of nodes, the scheme is not appropriate for two-node clusters or clusters that may easily degenerate into two-node clusters. For a two-node cluster, the quorum votes required for a two-node cluster is 2 (i.e., 2 (number of nodes in cluster)/2+1).) Therefore, I the case of two-node clusters, if one node fails, then the remaining operational node is not able to create a cluster because the remaining operation node will never be able to obtain a quorum of 2.

The aforementioned scheme has been modified to address two-node clusters. Specifically, a quorum device is connected to the cluster such that each node in the cluster is able to communicate with the quorum device. The purpose of the quorum device is to provide an additional quorum vote. Thus, the quorum vote provided by the quorum device allows a single node in the two-node cluster to create a cluster in the event that the other node is not operational or experiencing communication difficulty. More specifically, each node in the two-node cluster includes functionality to reserve the quorum device, and thereby obtain the quorum vote associated with the quorum device. The ability to reserve the quorum device also provides a means for indicating, to the other node in the two-node cluster, that the quorum vote associated with the quorum device is in use, thereby preventing the node that does not have the quorum vote associated with the quorum device from creating a new cluster.

Quorum devices are typically shared storage devices (such as SCSI disks) and are referred to a quorum disks. The quorum disk is connected to all nodes that have a potential of joining the cluster. The use of a quorum disk typically requires that the nodes in the cluster have the appropriate hardware and software for interacting with the quorum disk.

SUMMARY

In general, in one aspect, the invention relates to a method for obtaining a quorum vote by a first node (100) using a quorum cable (121), wherein the quorum cable (121) comprises a first end (123) connected to the first node (123) and a second end (125) connected to a second node (102), comprising determining whether the quorum cable (121) is reserved by the second node (125) using a remote reservation input (RRI) (124) on the first end (123), if the quorum cable (121) is not reserved by the second node (102), asserting a local reservation input (LRI) (122) on the first end (123) by the first node (100), monitoring a local reservation output (LRO) (126) on the first end (123) by the first node (100) to determine whether the LRO (126) on the first end (123) is asserted in response to asserting the LRI (122) on the first end (123), and obtaining the quorum vote by the first node (100), if the LRO (126) on the first end (123) is asserted.

In general, in one aspect: the RRI (124) on the first end (123) is asserted when the RRI (124) on the first end (123) registers a high signal, asserting the LRI (122) on the first end (123) by the first node (100) comprises sending a high signal; the RRI (124) on the first end (123) corresponds to a carrier detect signal, the LRO (126) on the first end (123) corresponds to a clear-to-send signal; the LRI (122) on the first end (123) corresponds to a data terminal ready signal, the quorum cable (121) is a serial cable; the first end (123) and the second end (125) comprise RJ-45 connectors; the LRO (126) on the first end (123) is connected to a RRI (130) on the second end (125), the RRI (124) on the first end (123) is connected to a LRI (126) on the second end (128), a LRO (132) on the second end (125) is connected to the RRI (124) on the first end (123), and the RRI (130) on the second end (125) is connected to the LRI (122) on the first end (123); the first end (123) is operatively connected to the first node (100) using a quorum cable module (110); the quorum cable module (110) is operatively connected to a cluster membership monitor (106) located on the first node (100); and the cluster membership monitor (106) is configured to determine whether the first node (100) has obtained enough quorum votes to create a cluster.

In general, in one aspect, the invention relates to a cluster comprising a quorum cable (121) having a first end (123) and a second end (125), a first node (100) connected to the first end (123), and a second node (102) connected to the second end (125), wherein the first node (100) and the second node (102) comprise functionality to reserve the quorum cable (121), thereby obtaining a quorum vote.

In general, in one aspect: the first pre-determined amount of time and the second pre-determined amount of time are randomly determined; the first pre-determined amount of time is determined using information associated with the first node (100) and the second pre-determined amount of time is determined using information associated with the second node (102); executing the collision detection algorithm, comprises functionality to: obtain a first priority information associated with the first node (100), obtain a second priority information associated with the second node (102), determine whether the first node (100) or the second node (102) has priority to reserve the quorum cable (121) using the first priority information and the second priority information, stop assertion of second LRI (128) by the second node (102), if the first node (100) has priority, and stop assertion of the first LRI (122) by the first node (100), if the second node (102) has priority; the quorum cable (121) is a serial cable; and the first end (123) and the second end (125) comprise RJ-45 connectors.

Other aspects and advantages of the invention will be apparent from the following description and the appended claims.

DETAILED DESCRIPTION

Figure 1:
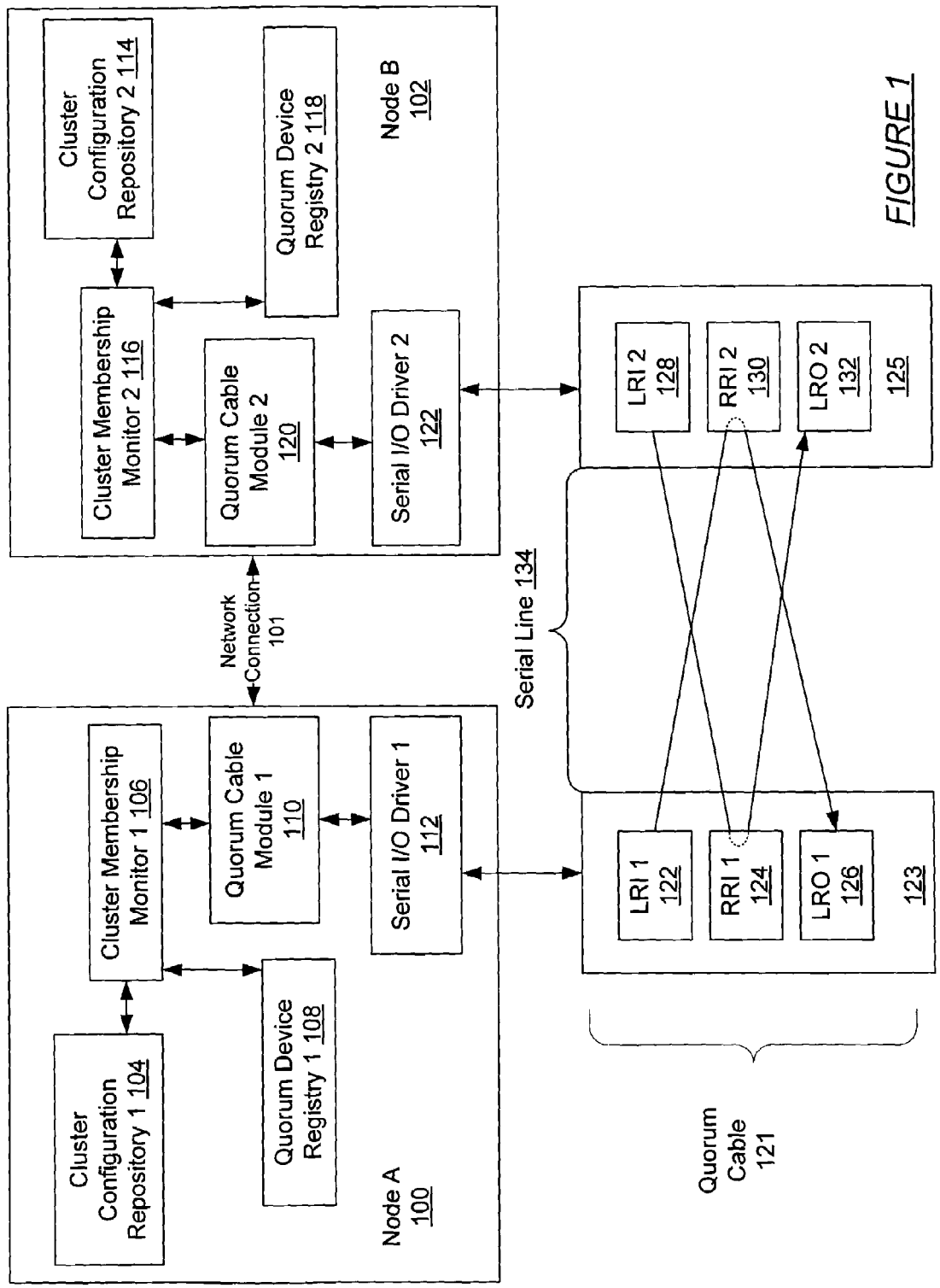
FIG. 1 shows a cluster in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for using a quorum cable. More specifically, embodiments of the invention provide a method and apparatus to use a quorum cable in a two-node cluster or a cluster that may degenerate to a two-node cluster. Further, embodiments of the invention provide a method and apparatus for using quorum cable to provide a quorum vote to one node in the cluster, thereby enabling creation of a cluster. In addition, embodiments of the invention provide a quorum cable that requires a minimal amount of hardware and software to operate, thereby enabling nodes with minimal amounts of external interfaces and limited resources to be used in clusters.

FIG. 1 shows a cluster in accordance with one embodiment of the invention. The cluster shown in FIG. 1 includes two nodes: Node A (100) and Node B (102). Though not shown in FIG. 1, each node (i.e., Node A (100) and Node B (102)) includes at least a processor, memory (e.g., random access memory (RAM), read-only memory (ROM), etc.), and a network interface. Further, each node (i.e., Node A (100) and Node B (102)) is connected to at least one other node in the cluster by some form of network connection (e.g., network connection (101)). As shown in FIG. 1, each node (i.e., Node A (100), Node B (102)) includes a cluster membership monitor (CMM) (CMM 1 (106), CMM 2 (116)), a cluster configuration repository (CCR) (CCR 1 (104), CCR 2 (114)), a quorum device registry (QDR) (QDR 1 (108), QDR 2 (118)), a quorum cable module (QCM) (QCM 1 (110), QCM 2 (120)), and a serial I/O driver (SID) (SID 1 (112), SID 2 (122)). Each of the aforementioned components is described in detail below.

In one embodiment of the invention, the CMM (CMM 1 (106), CMM 2 (116)) includes software that maintains a consistent cluster membership list (i.e., maintains a list of the current nodes in the cluster). The cluster membership list maintained by the CMM (CMM 1 (106), CMM 2 (116)) is used to configure and manage the cluster. Further, the CMM (CMM 1 (106), CMM 2 (116)) includes functionality to ensure that non-cluster members (i.e., nodes that are not members of the cluster) cannot corrupt data and transmit corrupt or inconsistent data to clients using services provided by the cluster. In addition, the CMM (CMM 1 (106), CMM 2 (116)) includes functionality to obtain quorum votes, create a cluster if there is a sufficient number of quorum votes, and to execute a collision detection algorithm (described below) if two (or more) nodes that belong to the same cluster attempt to simultaneously (or within a specific timeframe) create two instances of the same cluster.

Further, the CMM (CMM 1 (106), CMM 2 (116)) includes functionality to interface with the CCR (CCR 1 (104), CCR 2 (114)), the QDR (QDR 1 (108), QDR 2 (118)), and the QCM (QCM 1 (110), QCM 2 (120)). In one embodiment of the invention, the CCR (CCR 1 (104), CCR 2 (114)) is a highly available, replicated data store (e.g., one CCR per node) that is configured to persistently store cluster configuration information (e.g., node names, listing of quorum devices, etc.). In one embodiment of the invention, the QDR (QDR 1 (108), QDR 2 (118)) maintains a list of all the quorum devices (e.g., quorum cable (121), etc.) connected to the cluster. In one embodiment of the invention, the QCM (QCM 1 (110), QCM 2 (120)) is configured to provide an interface between the quorum cable (121) (via the SID) and the CMM (CCM 1 (106), CMM 2 (116)). In particular, the QCM (QCM 1 (110), QCM 2 (120)) provides a layer of abstraction between the quorum device (121) and the CMM (CCM 1 (106), CMM 2 (116)).

More specifically, when the QCM (QCM 1 (110), QCM 2 (120)) receives commands/data from the CMM (CMM 1 (106), CMM 2 (116)), the QCM (QCM 1 (110), QCM 2 (120)) converts the commands/translates data into a form that may be interpreted by the SID (SID 1 (112), SID 2 (122)). The SID (SID 1 (112), SID 2 (122)), which includes device specific functionality to interact with the quorum cable (121), subsequently forwards the converted commands/translated data to the quorum cable (121). The SID (SID 1 (112), SID 2 (122)) also includes functionality to receive data from the quorum cable (121) and monitor various inputs/outputs (described below) on the quorum cable (121). Further, the SID (SID 1 (112), SID 2 (122)) includes functionality to assert a high signal and/or a low signal at one or more inputs on the quorum cable (121).

In one embodiment of the invention, quorum cable (121) includes two ends (123, 125). The ends (123, 125) of the quorum cable (121) are physically connected to Node A (100) and Node B (102), respectively. As shown in FIG. 1, each end (123, 125) of the quorum cable (121) includes a local remote input (LRI) (LRI 1 (122), LRI 2 (128)), a remote reservation input (RRI) (RRI 1 (124), RRI (130)), and a local reservation output (LRO) (LRO 1 (126), LRO 2 (132)). In one embodiment of the invention, the ends (123, 125) of the quorum cable (121) are connected together via a plurality of wires (e.g., serial line (134)), or any other transmission medium capable to transmitting a signal from the end (123, 125) of the quorum cable (121) to another end of the quorum cable (121). In one embodiment of the invention, LRI 1 (122) is connected to RRI 2 (130), RRI 1 (124) is connected to LRO 2 (132), LRI 2 (128) is connected to RRI 1 (124), and RRI 2 (130) is connected to LRO 1 (126). Further, as shown in FIG. 1, a single cable may be connected to LRI 1 (122), RRI 2 (130), and LRO 1 (126), such that when a signal is asserted on LRI 1 (122), the signal is seen on both RRI 2 (130) and LRO 1 (126). Similarly, a single cable may connect LRI 2 (128), RRI 1 (124), and LRO 2 (132), such that when a signal is asserted on LRI 2 (128), the signal is seen on both RRI 1 (124) and LRO 1 (132).

In one embodiment of the invention, the quorum cable (121) corresponds to any type of serial cable. Further, each end (123, 125) of the quorum cable (121) may correspond to any type of connector that may be used to connect the end (123, 125) to the respective node (e.g., Node A (100), Node B (102)) such as an RJ-45 connector, etc. In addition, the protocol used for sending and receiving the signals on the quorum cable (121) may correspond to any serial (or equivalent) communications protocol standard such as the RS-232 protocol, the RS-423 protocol, etc. In one embodiment of the invention, if the RS-232 protocol is used, then LRI corresponds to the data terminal ready (DTR) signal, RRI corresponds to the carrier detect (CD) signal, and LRO corresponds to the clear-to-send (CTS) signal.

Figure 2:
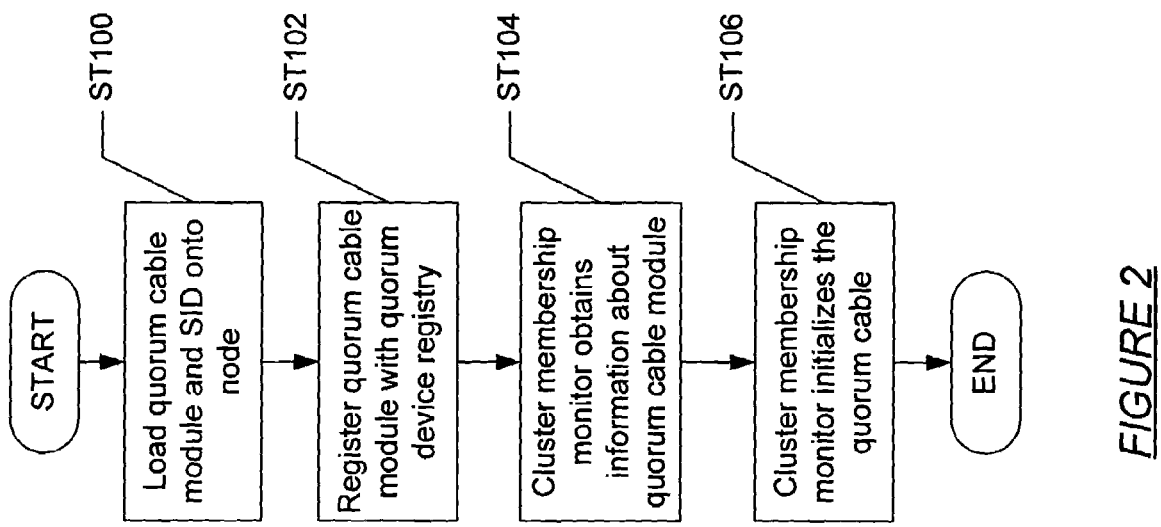
FIGS. 2 and 3 show flowcharts in accordance with one embodiment of the invention.

FIG. 2 shows a flowchart for a method of initializing a node in the cluster to use the quorum cable. Initially, a QCM and a SID are loaded onto the node (ST 100). Those skilled in the art will appreciate the other components shown in FIG. 1 (i.e., the CCR, the QDR, and the CMM) are already loaded on the node. The QCM is subsequently registered with the QDR, thereby indicating to the CMM that the QCM is available to use on the node (ST 102). The CMM, upon discovering that the QCM is available to use on the node, obtains configuration information about the QCM (i.e., information about the QCM which includes information about the quorum cable) (ST 104). Once the CMM has obtained the necessary information, the CMM issues the appropriate commands to initialize the quorum cable (and the QCM, as necessary) (ST 106). In one embodiment of the invention, initializing the quorum cable corresponds to asserting (i.e., sending a high signal) on one or more inputs (i.e., LRI, RRI, etc.) on the quorum cable.

The aforementioned method is repeated for each node that the quorum cable is connected to (or to which the quorum cable is planned to be connected). Once the aforementioned method has been performed on the appropriate nodes and the quorum cable is physically connected to the nodes, the cluster (or more specifically the nodes in the cluster) may now reserve the quorum cable and obtain quorum votes (as need) to form a cluster.

Figure 3:
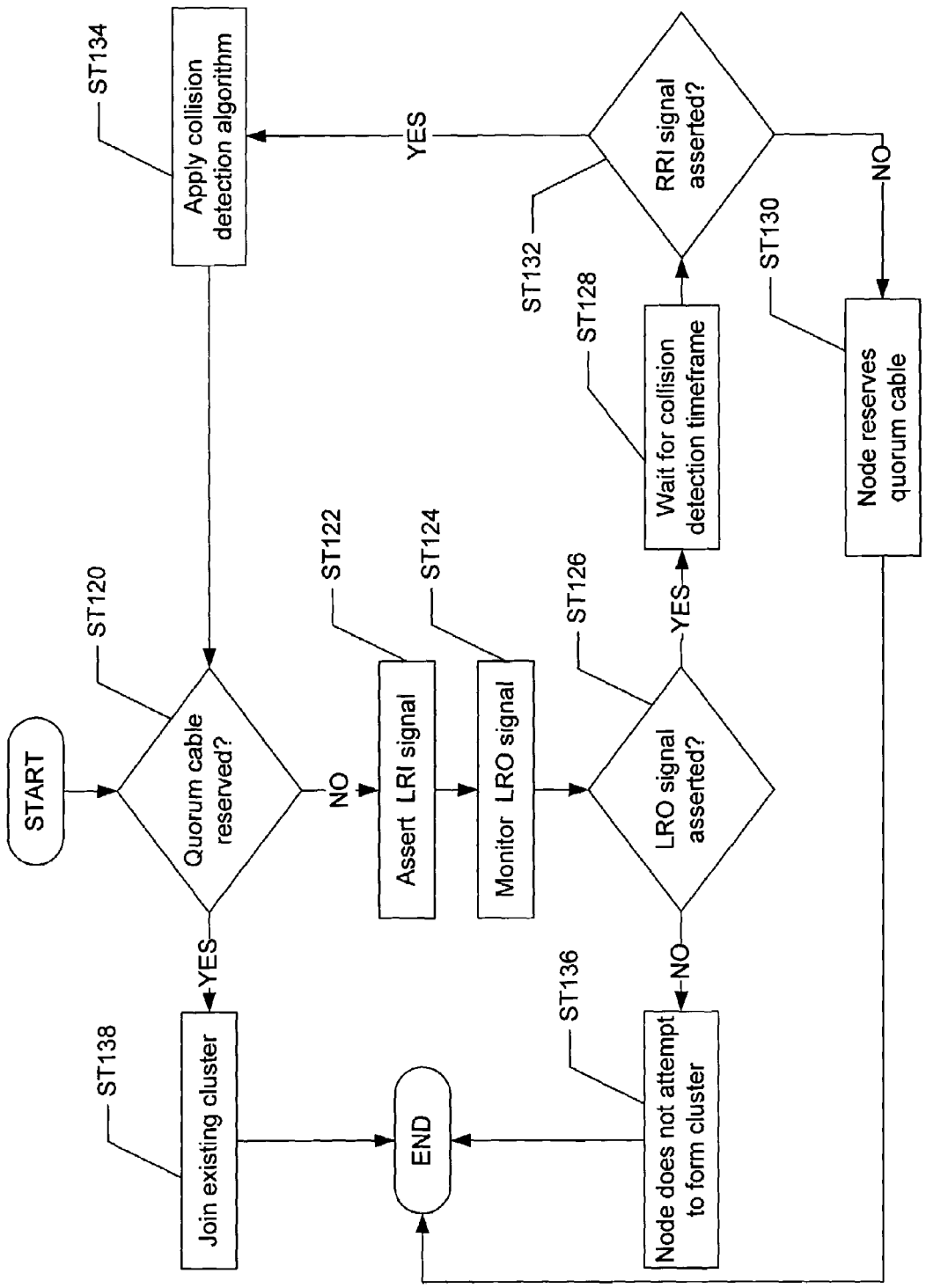

FIG. 3 shows a flowchart for a method of reserving the quorum cable and thereby obtaining a quorum vote, in accordance with one embodiment of the invention. Those skilled in the art will appreciate that the following method is personnel only as required by the clustering software. More specifically, the following method is performed whenever a need exists to obtain a quorum and there are not sufficient quorum votes from the nodes in the cluster to form a quorum. As discussed above, such scenarios commonly occur when communication failures occur between nodes in the cluster or when one or more nodes in the cluster fail.

Once a node in the cluster determines that the quorum cable must be used to obtain a quorum vote, the node determines whether the quorum cable is currently reserved (ST120). In one embodiment of the invention, the node (under control of the CMM) determines whether the RRI, on the end of the quorum cable connected to node, is asserted. For example, if Node A (100) in FIG. 1 is attempting to reserve the quorum cable, then Node A (100) would determine whether RRI 1 (124) is asserted. If the RRI is asserted, then the quorum cable is already reserved. Thus, the node should attempt to join an existing cluster (ST 138). In the aforementioned scenario, a communications failure likely the cause of the node failing to discover the existence of the cluster to which it was supposed to join. Thus, after the node determines that quorum cable is reserved, the node may have to wait until such time as the communication between the node and the cluster is restored before joining the cluster.

Continuing with the discussion of FIG. 2, if the RRI is not asserted, then the node may attempt to reserve the quorum cable. The node attempts to reserve the quorum cable by first asserting the LRI signal on the end of the quorum cable connected to the node (ST 122). For example, if Node A (100) is attempting to reserve the quorum cable, Node A (100) will assert LRI 1 (122). Once the LRI is asserted, the node monitors the corresponding LRO (ST 126). Thus, after asserting LRI 1 (122), Node A (100) would monitor the signal on LRO 1 (126). In one embodiment of the invention, because there is one cable connecting LRI 1 (122), RRI 2 (130), and LRO 1 (126), once LRI 1 (122) is asserted RRI 2 (130) and LRO 1 (126) should be asserted.

Continuing with the discussion of FIG. 3, the CMM (or a related process executing on the node) subsequently determines, via the monitoring of the LRO, if the LRO has been asserted (ST 126). When the LRO is not asserted in response to the assertion of the LRI, this typically indicates that the quorum cable is damaged. Thus, if the LRO is not asserted in response to the LRI, then the node is not able to reserve the quorum cable and thus does not attempt to form a cluster (ST 126). Alternatively, if the LRO signal is asserted, then the node asserting the LRI signal waits for the collision detection timeframe to elapse (ST 128).

In one embodiment of the invention, the collision detection timeframe corresponds to a period of time during which a collision may occur. Collisions typically occur when both nodes in a two-node cluster simultaneously (or nearly simultaneously) boot and attempt to reserve the quorum cable in order to create a cluster. In attempting to reserve the quorum cable, each node will assert their respective LRI and wait to receive a response on their respective LRO. Because the RRI on either end of quorum cable was not previously asserted, when the nodes see that their respective LRO signals are asserted both nodes will believe that they have reserved the quorum cable. If this scenario is not prevented, each node may form a cluster resulting in the "split-brain" scenario discussed above.

Due to the fact that the collisions may only occur during a specific timeframe (e.g., the period of time between determining whether RRI is asserted and determining whether LRO is asserted in response to asserting LRI), the node has to only check whether the RRI has been asserted to determine whether a collision has occurred. Thus, once the collision detection timeframe has elapsed (ST 128), the node proceeds to check whether the RRI has been asserted (ST 132). If the RRI is not asserted (i.e., the RRI has been not asserted since the time it was last checked i.e., at ST 120), then a collision has not occurred and the node may proceed to reserve the quorum cable (ST 130).

If a collision is detected, the node proceeds to execute the collision detection algorithm (ST 134). In one embodiment of the invention, the collision detection algorithm forces both nodes to stop asserting the LRI signal and then provides each node with a pre-determined time period during which the node may not re-assert the LRI signal. In one embodiment of the invention, the length of the pre-determined time period for each node is randomly determined. Further, in one embodiment of the invention, the pre-determined time period for each node is different. Alternatively, the CMM may obtain information about the nodes involved in the collision and use information about the nodes to determine which of the nodes should stop asserting the LRI and which node should continue to assert the LRI. After the collision detection algorithm has executed (i.e., ST 134), Steps 120-138 are repeated until one of the nodes reserves the quorum cable.

Figure 4:
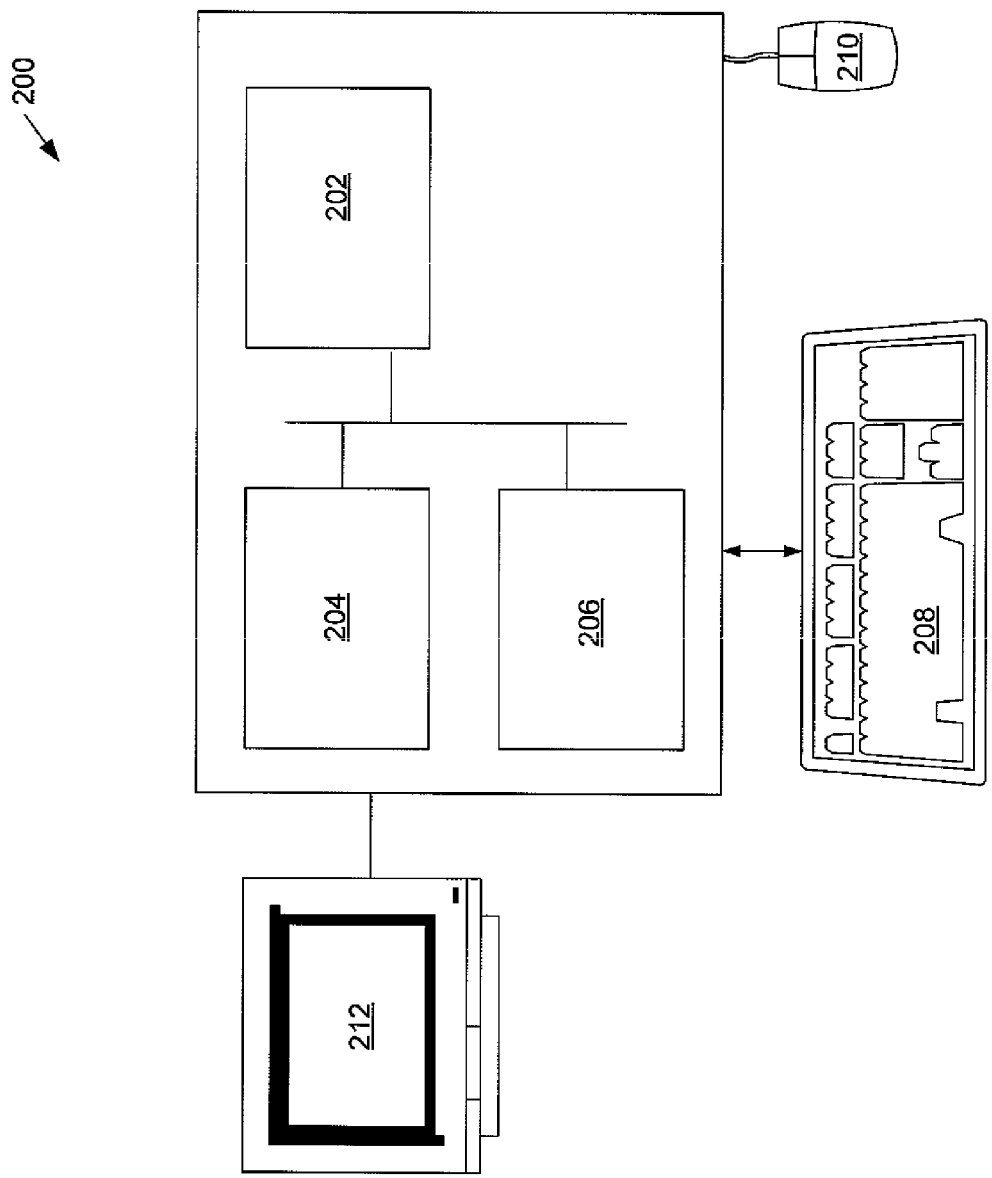
FIG. 4 shows a computer system in accordance with one embodiment of the invention.

The term "nodes" used to describe the invention corresponds to virtually any type of computer running any type of platform. For example, as shown in FIG. 4, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a quorum vote by a first node using a quorum cable, comprising:
   determining that a network connection between the first node and a second node is inactive, wherein the network connection is associated with a local area network;
   determining whether the quorum cable is reserved by the second node using a remote reservation input (RRI) on a first end;
   if the quorum cable is not reserved by the second node:
      asserting a local reservation input (LRI) on the first end by the first node;
      monitoring a local reservation output (LRO) on the first end by the first node to determine whether the LRO on the first end is asserted in response to asserting the LRI on the first end; and
      obtaining the quorum vote by the first node, if the LRO on the first end is asserted,
      wherein the quorum vote is obtained without direct communication between the first node and the second node,
   wherein the quorum cable comprises the first end directly connected to the first node and the second end directly connected to a second node.

2. The method of claim 1, further comprising, prior to obtaining the quorum vote:
   waiting for a collision detection timeframe to elapse, if the first LRO was asserted;
   monitoring the RRI on the first end by the first node to determine whether the RRI on the first end is asserted after the collision detection timeframe has elapsed, if the LRO on the first end was asserted; and
   executing a collision detection algorithm if the RRI on the first end is asserted after the collision detection timeframe has elapsed.

3. The method of claim 2, wherein executing the collision detection algorithm, comprises:
   stopping assertion of the LRI on the first end by the first node;
   stopping assertion of a LRI on the second end by the second node;
   reasserting the LRI on the first end by the first node after a first pre-determined amount of time; and
   reasserting the LRI located on the second end by the second node after a second pre-determined amount of time.

4. The method of claim 3, wherein the first pre-determined amount of time and the second pre-determined amount of time are randomly determined.

5. The method of claim 3, wherein the first pre-determined amount of time is determined using information associated with the first node and the second pre-determined amount of time is determined using information associated with the second node.

6. The method of claim 2, wherein executing the collision detection algorithm, comprises:
   obtaining a first priority information associated with the first node;
   obtaining a second priority information associated with the second node;
   determining whether the first node or the second node has priority to reserve the quorum cable using the first priority information and the second priority information;
   stopping assertion of a LRI on the second end by the second node, if the first node has priority; and
   stopping assertion of the LRI on the first end by the first node, if the second node has priority.

7. The method of claim 1, using the RRI on the first end to determine whether the quorum cable is reserved, wherein determining whether the quorum cable is reserved comprises determining whether the RRI on the first end is asserted.

8. A cluster comprising:
   a quorum cable having a first end and a second end;
   a first node directly connected to the first end; and
   a second node directly connected to the second end,
   wherein the first node and the second node comprise functionality to reserve the quorum cable, thereby obtaining a quorum vote, wherein the quorum vote is obtained without direct communication between the first node and the second node,
   wherein the first end comprises a first local reservation input (LRI), a first local reservation output (LRO), and a first remote reservation input (RRI), and the second end comprises a second LRI, a second LRO, and a second RRI,
   wherein the first node and the second node are connected via a network connection associated with a local area network.

9. The cluster of claim 8, wherein
   the first LRO is connected to the second RRI,
   the first RRI is connected to the second LRI,
   the second LRO is connected to the first RRI, and
   the second RRI is connected to the first LRI.

10. The cluster of claim 8, wherein functionality to reserve the quorum cable by the first node comprises functionality to:
   determine whether the quorum cable is reserved using the first RRI;
   if the quorum cable is not reserved by the second node:
      assert the first LRI by the first node;
      monitor the first LRO by the first node to determine whether the first LRO is asserted in response to asserting the first LRI; and
      obtain the quorum vote by the first node, if the first LRO is asserted.

11. The cluster of claim 10, further comprising functionality to:
prior to obtaining the quorum vote:
wait for a collision detection timeframe to elapse, if the first LRO was asserted;
monitor the first RRI by the first node to determine whether the first RRI is asserted after the collision detection timeframe has elapsed, if the first LRO was asserted; and
execute a collision detection algorithm if the first RRI is asserted after the collision detection timeframe has elapsed.

12. The cluster of claim 11, wherein executing the collision detection algorithm, comprises functionality to:
stop assertion of the first LRI by the first node;
stop assertion of the second LRI byte second node;
reassert the first LRI by the first node after a first pre-determined amount of time; and
reassert the second LRI by the second node after a second pre-pre-determined amount of time.

* * * * *